June 20, 1933.  T. M. HEERMANS  1,914,918
MACHINE DRIVE
Filed April 9, 1931

Inventor
T. M. Heermans
by G. J. DeWein
Attorney

Patented June 20, 1933

1,914,918

UNITED STATES PATENT OFFICE

THOMAS M. HEERMANS, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

MACHINE DRIVE

Application filed April 9, 1931. Serial No. 528,733.

This invention relates in general to improvements in machine drives, and is more particularly concerned with installations wherein driving and driven elements are located at opposite sides of a wall or partition.

It has heretofore been customary where driving and driven elements are located at opposite sides of a wall or partition, as for the purpose of protecting one or the other of elements against the effects of fire, harmful gases, or dust, to pass the shaft through an opening in the partition, and this, because of necessary clearance about the shaft has made it difficult to most effectively protect against such harmful effects.

The present invention is particularly concerned with securing a high degree of safety and protection for an efficient operation of the apparatus of an installation of the above described general character.

An object of the invention is to provide a simple and efficient improved design and construction involving an assemblage of machine elements located at opposite sides of a partition and a driving connection therebetween.

A further object of the invention is to provide an improved construction or assemblage including a shaft section which passes through an aperture in a wall or partition and is connected respectively to the shaft of a machine located at one side of the wall and to the shaft of a driving motor at the other side of the wall.

A further object of the invention is to provide an improved design of construction of the character described above wherein an intermediate shaft element passing through a wall is supported in a manner which readily permits alignment with the shafts of machines at opposite sides of the wall, and wherein either machine may be removed for inspection or repair without disturbing the intermediate shaft element.

These and other objects and advantages are attained by the present invention, various novel features of which will be apparent hereinbelow and from the accompanying drawing disclosing an embodiment of the invention, and will be more particularly pointed out in the claims.

Figure 1:
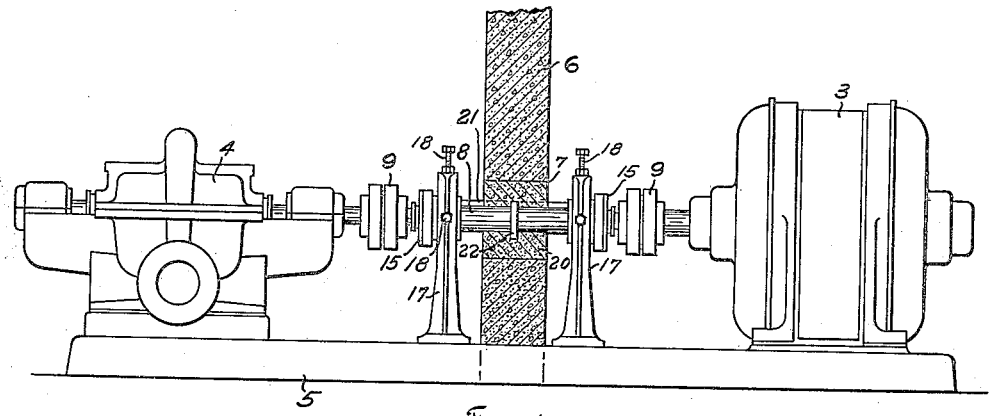
Fig. 1 is a side elevation of a machine assemblage, with parts in section, embodying the present invention.
Figure 2:
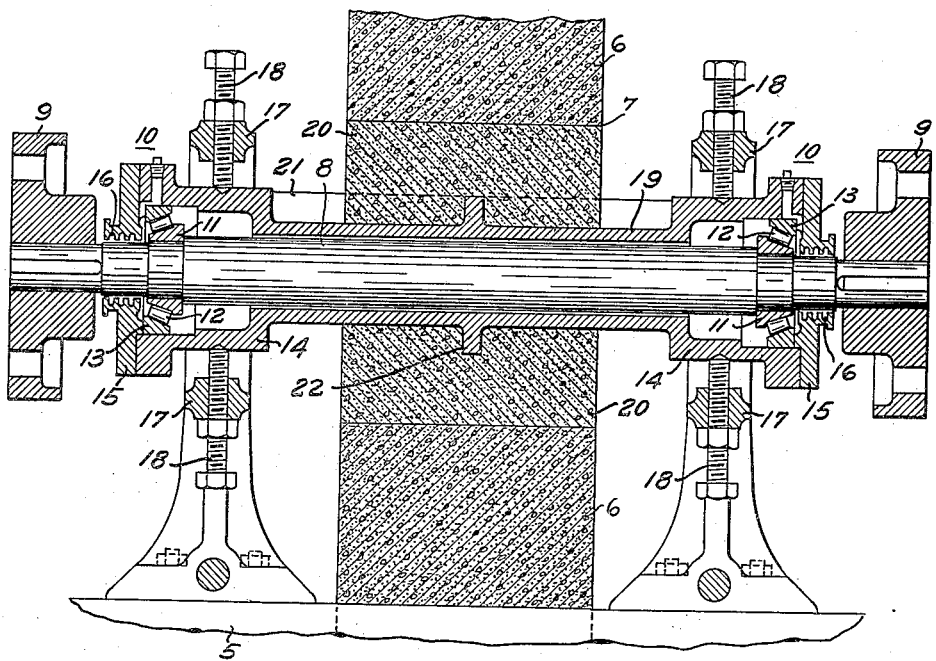
Fig. 2 is an enlarged fragmentary vertical section through a portion of the assembly of Fig. 1.

Referring to the drawing, there is shown therein a motor operated pumping unit comprising a motor 3 connected in driving relation to a pump 4, which may be of the conventional centrifugal type, both the motor and the pump being mounted in operative position on a common supporting or base plate 5, the motor and pump being disposed at opposite sides of a wall or partition 6 having an aperture therein, indicated at 7, for the passage therethrough of the shaft connection 8, uniting the respective shafts of the motor and the pump and being connected thereto by means of detachable couplings 9, preferably of the flexible type.

The shaft connection 8 is mounted in operative position upon bearings 10, located at opposite sides of the wall 6 and herein indicated as being of the roller type and capable of absorbing end thrust in either direction. Each of the bearings is indicated as including a rotating member or race 11 and rollers 12 cooperative therewith and with a stationary element or race 13 secured in position in a bearing housing 14 which is sufficiently enlarged to form a receptacle for lubricant, such as grease which may be injected through a conventional type of filling opening provided with a suitable type of removable closure as indicated. Closures or end plates 15, provided with suitable packing glands 16, are secured to the end portions of the bearing housings 14 to form therewith effective fluidtight seals.

The bearing housings 14 are held in operative position by means of supports 17 mounted on the base 5 at opposite sides of the wall 6, the supports being herein shown as of a conventional ceiling hanger type, but mounted or supported in reversed position, adjusting screws 18 being mounted in the supports and engaging the housing 14 at spaced points to effectively support the latter in position, this arrangement, through adjustability of the supporting screws 18, readily permitting horizontal as well as vertical adjustment of the bearing housings and consequently of the shaft connection 8 supported thereby and insuring the desired alignment of the shaft connection with the respective shafts of the pump 4 and the motor 3.

A sleeve or tubular element 19, passing through the aperture 7 in the wall 6 and providing appreciable clearance for the shaft connection 8, is secured to the bearing housings 14, preferably by being formed integral therewith, one or more longitudinal ribs 21 and one or more radially extending projections 22 on the sleeve 19 being embedded in and interlocking with the material of a solidifying filling 20 inserted in the aperture, to prevent movement of the sleeve.

Assume that the unitary or common supporting base 5 for the motor 3 and the pump 4 and the bearing supports 17, is located in position on a floor or like foundation, and the wall 6, with the enlarged aperture 7 therein, has been built into position with portions of the base 5 extending beyond the opposite sides of the wall and the material of the wall forming with the base a substantially fluid tight seal against the passage of fluids from one side of the wall to the other along the surface of the base. In assembling the intermediate shaft section in operative position, the enclosing sleeve 19, with its integral bearing housings 14, and the shaft section 8 operatively mounted in its bearings, are inserted through the apertures in supports 17 and the enlarged aperture 7 in the wall 6. The screws 18 are then adjusted to bring the sleeve 19 and the shaft 8 supported therein into desired finally adjusted and aligned position after which the adjusting screws are locked in adjusted position by a conventional form of lock nut; and shaft section 8 is then connected to the motor and pump shafts through the couplings 9. With the parts in this condition, the aperture 7 is completely filled in, preferably with an originally plastic grouting or filling material indicated at 20, in such a manner as to produce an effective fluid-tight seal between this portion of the wall and the outer surface of the sleeve 19. With the parts in these positions and the filling material 20 in hardened condition and forming an integral portion of the structure of the wall 6, the ribs 21 and 22 embedded therein prevent displacement of the sleeve. The hardened wall structure formed by the filling material in addition to forming a closure or seal about the sleeve 19, serves as an additional support for the latter and the parts carried therein.

With the parts assembled in position as hereinabove described, all inconvenience and danger of the passage of moisture and undesirable vapors and gases, and even fire, from one side of the wall 6 to the other, is avoided. This desirable result may be more effectively accomplished by completely filling the available clearance between the shaft and the surrounding sleeve and the bearings with lubricant, such as grease, and sealing against leakage therefrom. It will be further apparent that, with the assemblage described, the removal of either the driving motor or the pump, for repair or inspection and its replacement, may be readily effected without disturbing the intermediate shaft element.

It will be understood that it is not desired to limit the invention to the exact details of construction and assembly herein shown and described, for various modifications within the scope of the appended claims, may occur to persons skilled in the art.

It is claimed and desired to secure by Letters Patent:

1. In combination, a wall provided with an enlarged aperture, a driving motor mounted in operative position independently of and at one side of said wall, a machine mounted in operative position independently of and at the other side of said wall, a driving connection between said motor and said machine, comprising a separate shaft section passing through the aperture in said wall, bearings for said shaft section including bearing housings positioned at opposite sides of said wall, adjustable supports carried independently of said wall for preliminarily adjustably carrying said shaft section through said bearings and bearings housings, and a tubular housing surrounding that portion of said shaft section passing through said wall and being rigidly united to said bearing housings, said tubular housing being surrounded by a filler material inserted in said enlarged wall aperture, said tubular housing forming with said bearing housings an enclosure for said shaft section, and said supports at the time of insertion of said filler material and after its insertion fixedly carrying said bearings and bearing housings.

2. In combination, an apertured wall, a rotary machine mounted at one side of said wall, a second rotary machine mounted at the other side of said wall, both of said machines being carried independently of said wall, a driving connection between said machines, said connection comprising a shaft section having end couplings, said shaft section extending through an aperture in said wall, bearings for said shaft section, located at opposite sides of said wall and intermediate said shaft couplings, means surrounding and embracing the intermediate portion of said shaft section and bearings thereof, and bearing supports located at opposite sides of said wall and carried independently of said wall, for supporting said bearings through portions of said means, said means forming with said shaft section and with said wall fluid tight joints.

3. In combination, an apertured side wall, a base plate mounted on a floor, a rotary machine mounted directly on said base plate at one side of said wall, a second rotary machine also mounted directly on said base plate at the other side of said wall, a driving connection between said machines, said connection comprising a shaft section having end couplings, said shaft section extending through an aperture in said wall, bearings for said shaft section, located at opposite sides of said wall and intermediate said shaft couplings, means surrounding and embracing the intermediate portion of said shaft section and bearings thereof, and bearing supports mounted on said base plate and carried independently of and located at opposite sides of said wall, for supporting said bearings through portions of said means, said means forming with said shaft section and with said wall, fluid tight joints and said base plate similarly forming with said wall a fluid tight joint.

4. The combination of a shaft preliminarily adjustably supported adjacent its ends for effecting a properly alined driving connection between two machines having their shafts in alinement, and a composite fire wall having a portion packed with hardened filler material and having a housing sealed with the shaft, said housing being anchored in the filler material and surrounding and encasing the intermediate portions of the shaft, the preliminarily adjustable support feature of the shaft residing in means supported independently of the wall, said wall being for the purpose of locating two machines connected by said shaft in rooms such that complete isolation of the ends of the shaft is attained and each end of the shaft is protected from fire or other detrimental fluid agency arising in or present in the vicinity of the machine connected to the other end of the shaft.

In testimony whereof, the signature of the inventor is affixed hereto.

THOMAS M. HEERMANS.